(12) United States Patent
Wille et al.

(10) Patent No.: US 6,862,683 B1
(45) Date of Patent: Mar. 1, 2005

(54) METHOD AND SYSTEM FOR PROTECTING NATIVE LIBRARIES

(75) Inventors: Robert Baird Wille, Mapleton, UT (US); Russell Lane Black, Orem, UT (US)

(73) Assignee: Novell, Inc., Provo, UT (US)

(*) Notice: Subject to any disclaimer, the term of this patent is extended or adjusted under 35 U.S.C. 154(b) by 0 days.

(21) Appl. No.: 09/534,362

(22) Filed: Mar. 24, 2000

(51) Int. Cl.[7] .............................................. G06F 1/26
(52) U.S. Cl. ..................... 713/151; 713/164; 713/167; 713/200; 713/201
(58) Field of Search ............................... 713/151, 164, 713/200, 201, 167

(56) References Cited

U.S. PATENT DOCUMENTS

| | | | |
|---|---|---|---|
| 5,542,045 A | | 7/1996 | Levine |
| 5,706,502 A | * | 1/1998 | Foley et al. .................... 707/10 |
| 5,771,348 A | | 6/1998 | Kubatzki et al. |
| 5,787,175 A | | 7/1998 | Carter |
| 5,870,544 A | | 2/1999 | Curtis |
| 5,892,899 A | | 4/1999 | Aucsmith et al. |
| 5,899,990 A | | 5/1999 | Maritzen et al. |
| 5,901,227 A | | 5/1999 | Perlman |
| 5,901,315 A | | 5/1999 | Edwards et al. |
| 5,933,503 A | | 8/1999 | Schell et al. |
| 5,935,247 A | | 8/1999 | Pai et al. |
| 5,935,249 A | * | 8/1999 | Stern et al. .................. 713/201 |
| 5,978,914 A | | 11/1999 | Carley et al. |
| 5,983,348 A | | 11/1999 | Ji |
| 5,987,608 A | | 11/1999 | Roskind |
| 5,995,102 A | * | 11/1999 | Rosen et al. ................. 345/856 |
| 5,995,945 A | * | 11/1999 | Notani et al. .................. 705/28 |
| 6,006,328 A | | 12/1999 | Drake |

\* cited by examiner

*Primary Examiner*—Thomas R. Peeso
(74) *Attorney, Agent, or Firm*—Pillsbury Winthrop LLC

(57) ABSTRACT

A method and system for protecting native libraries for Java and other applications. An application's native library may be embedded in a system of code, such as Java code, so the protections afforded the system of code are provided to the native library. At runtime, the native library may be written to a randomly selected filename in a local file system. The native library is then loaded to support native method implementations. Because the library is written to a different and randomly chosen filename each time, a hacker will not know beforehand what library is going to be used. This invention is generally useful for protecting any native library, regardless of whether it is part of a shared Java library or not. It provides any native library the same level of protection that the symbolic obfuscator, or other method of protecting Java code, gives the Java code.

37 Claims, 4 Drawing Sheets

METHOD AND SYSTEM FOR PROTECTING NATIVE LIBRARIES

FIELD OF INVENTION

The present invention relates to protecting native libraries, more particularly to embedding native libraries in a system of code, such as Java code, and protecting the system of code where the protections available to the system of code are provided to the native libraries.

BACKGROUND OF THE INVENTION

Some Java applications and libraries include one or more native libraries. A native library includes functions written in a conventional language that are compiled into machine code. A Java application may include a native library for a number of reasons including performance, access to operating system services which are unavailable to Java code, access to legacy code, and other reasons. Traditionally, native libraries, and often the classes which call them, may be installed on a user's computer before the execution of applications which use the native libraries. Since native libraries are dynamically loaded, by nature they are susceptible to being compromised. It is generally fairly easy to replace a portion of an application, or a library, written in Java. If the native library is compromised, all applications that use that library, whether protected or not, will be compromised as well when the compromised library is used by that application.

Java has a number of mechanisms to protect Java code from inspection and/or from modification. Some frequently used mechanisms may include signed code, cryptographic obfuscation of the Java Archive ("JAR") file and symbolic obfuscation. Code signing allows a program to verify the origin of any classes it is going to call. Cryptographic obfuscation of the JAR file prevents inspection or modification of the contents without knowledge of the obfuscation key and algorithm, and where a special class loader may be used to deobfuscate the JAR file at runtime. Symbolic obfuscation involves scrambling the symbols of the class files in a JAR file to make it difficult to reverse engineer. While these techniques provide protection to Java code, they work on JAR files, and hence only apply to Java code. Therefore, these techniques do not adequately provide protection to native libraries. While traditional native libraries are typically not obfuscated, they can be signed. However, a Java Virtual Machine does not check signatures on native libraries, nor does it provide a mechanism for Java code to do so.

One traditional means of protecting the integrity of an application is to create a cryptographic binding between its various components. The cryptographic binding allows the caller to verify the origin of the code it is going to call. Optionally, it may also allow the callee to verify the origin of the code which called it. This technique is most often used to create a binding between two native libraries. This technique may also be used to create a binding that protects the integrity of a Java application that contains a native library. However, this method does not adequately prevent the native library from being compromised. In particular, a hacked native library which replaces the original native library may easily inspect the Java code which called it. This means that the keys which are used to create the binding may be easily discovered by the replacement library, allowing the replacement library to successfully impersonate the original library. Furthermore, passing the arguments and return values for each call through a cryptographic process negatively affects the performance of the calls into the native library. Therefore, a traditional cryptographic binding degrades the performance of the application while offering minimal integrity protection.

While maintaining the integrity of any application is important, of particular interest are applications which consume cryptographic services. It is important to preserve the integrity of such applications in order to maintain the confidentiality of the data to which the cryptography is applied. Furthermore, cryptographic technologies have been severely restricted by U.S. and international laws. In accordance with these laws, applications which consume cryptographic services may not be exportable if their cryptographic services can be easily subverted.

An attacker may compromise native libraries used by an application either by replacing the library on the file system, or by preloading a native library that exports the same symbols. For example, a first native library may export a symbol "aaa" and a second native library may also export the symbol "aaa". If the second native library is loaded before the first native library can be loaded, the Java application that calls for "aaa" will call the "aaa" symbol in the second native library instead of the "aaa" symbol in the first native library because Java uses the first symbol it sees of a particular name. Thus, the second native library (i.e., a rogue native library) will be called instead of the intended first native library.

One reason why developers use Java is that Java applications frequently do not need to be installed on a user's computer. They may be downloaded from a network as needed. However, if a Java application uses a native library, that application, or a portion of it typically must be installed. This encumbers the deployment of the application and increases the risk of native library being compromised.

These and other drawbacks exist with current systems.

SUMMARY OF THE INVENTION

An object according to the present invention is to overcome these and other drawbacks with existing systems.

Another object of the invention is to provide a mechanism for protecting native libraries by embedding the native library in a system of code where the native libraries are afforded the protections available to the system of code.

Another object of the invention is to provide a mechanism for protecting native libraries by embedding the native library in Java code protected by symbolic obfuscation, data obfuscation, signed classes, and other methods of protecting Java code.

Another object of the invention is to extract native library data from a protected file and write that data to a randomly selected filename on a local file system.

Another object of the invention is to prevent an attacker or other entity from pre-loading a native library by dynamically changing the names of symbols being exported.

Another object of the invention is to eliminate the need to install native libraries for Java applications.

According to an embodiment of the present invention, a mechanism for protecting native libraries for code applications is provided. Rather than installing a native library on a system, as is conventionally done, the present invention provides a system and method for embedding the native library in a system of code or scripting language that allows binding to native code. The system of code may then be protected by methods generally used to protect the system of code. At runtime, the native library may be extracted and written to a randomly selected filename in a local file system. The native library may then be loaded onto an environment to enable native method implementations. Because the library is written to a different and randomly chosen filename each time, hackers are unable to determine beforehand what library is going to be used.

According to another embodiment of the present invention, a mechanism for protecting native libraries for Java applications is provided. Java code may be protected by symbolic obfuscation, obfuscated JAR files, signing, or other methods of providing security and protection. By embedding the native library in the Java code, the present invention provides roughly the same level of protection to an application's native code as its Java code.

This invention is generally useful for protecting any native library, regardless of whether it is part of a shared Java library or not. It provides any native library the same level of protection that the symbolic obfuscator, or other method of protecting code, gives a scripting language or a system of code, such as Java code.

According to another embodiment of the present invention, a mechanism for preventing symbols of the same name from different native libraries from being pre-loaded is provided. This may be accomplished by obfuscating (or randomly renaming) the symbols exported by the native library when it is written to a local file system. The class file that contains the native methods undergoes a parallel obfuscation.

According to another embodiment of the present invention, the native library may be modified in other ways when it is written to a local file system, with the object of identifying the library as being authentic. For example, a nonce (e.g., a key or other similar mechanism) may be randomly selected at runtime and written to the native library. The native library and corresponding system of code may be written such that knowledge of the nonce is necessary for the library to function properly.

Other objects and advantages of the present invention will be apparent to one of ordinary skill in the art upon reviewing the specification herein.

DETAILED DESCRIPTION OF THE PREFERRED EMBODIMENTS

The present invention provides a method and system for protecting one or more native libraries by embedding the native library in a system of code or scripting language and protecting system of code or scripting language by using a protection mechanism. Prior to the invocation of the native library, the native library is extracted from the system of code. The process of extraction may include selecting data associated with the native library, extracting the data, and writing the data to a randomly selected filename. The native library may then be loaded to an environment to enable implementation of native methods associated with the native library.

Figure 1:
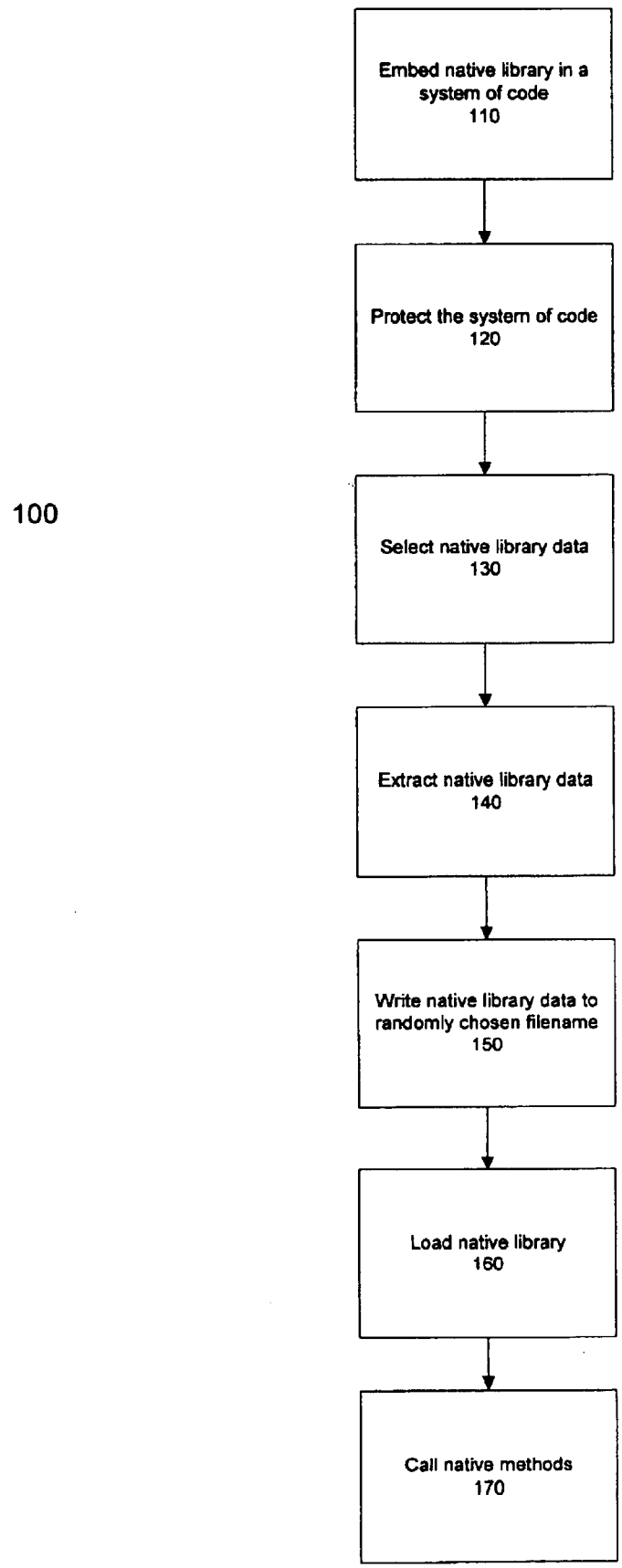
FIG. 1 is a flowchart of a method of protecting native libraries according to an embodiment of the present invention.

FIG. 1 illustrates a flowchart 100 for implementing the present invention. In step 110, the native library may be embedded in a system of code or scripting language. The system of code may then be protected by various methods to maintain security, in step 120. Such manners of protection may include methods of providing protection to the system of code. In step 130, the native library data, stored in the protected system of code, may be selected. In step 140, the native library data is extracted from the protected system of code. This native library data is then written to a randomly selected filename in a local file system, in step 150. The native library data is loaded via System.load( ) command, for example, in step 160. Once the native library is loaded using the native library data stored in the protected system of code, native methods may be called, in step 170.

According to another embodiment of the present invention, a method and system for protecting native libraries may involve embedding the native library in a Java Native Interface ("JNI") library and protecting the JNI library through a protection mechanism used to protect Java code. Before invoking a native method, a Java Virtual Machine ("JVM") loads a JNI library to support native methods implementation. A traditional JNI library may be developed for each targeted platform. According to an embodiment of the present invention, each platform-specific JNI library may be encoded as a uu-encoded string and embedded in a Java class. The present invention may select a class containing the JNI library data that corresponds to a particular platform where the class is protected and stored in a JAR file. The JNI library data is then extracted from the class and written to a randomly chosen filename in a local file system. After the JNI library is loaded onto the JVM, native library implementation methods may be implemented.

Figure 2:
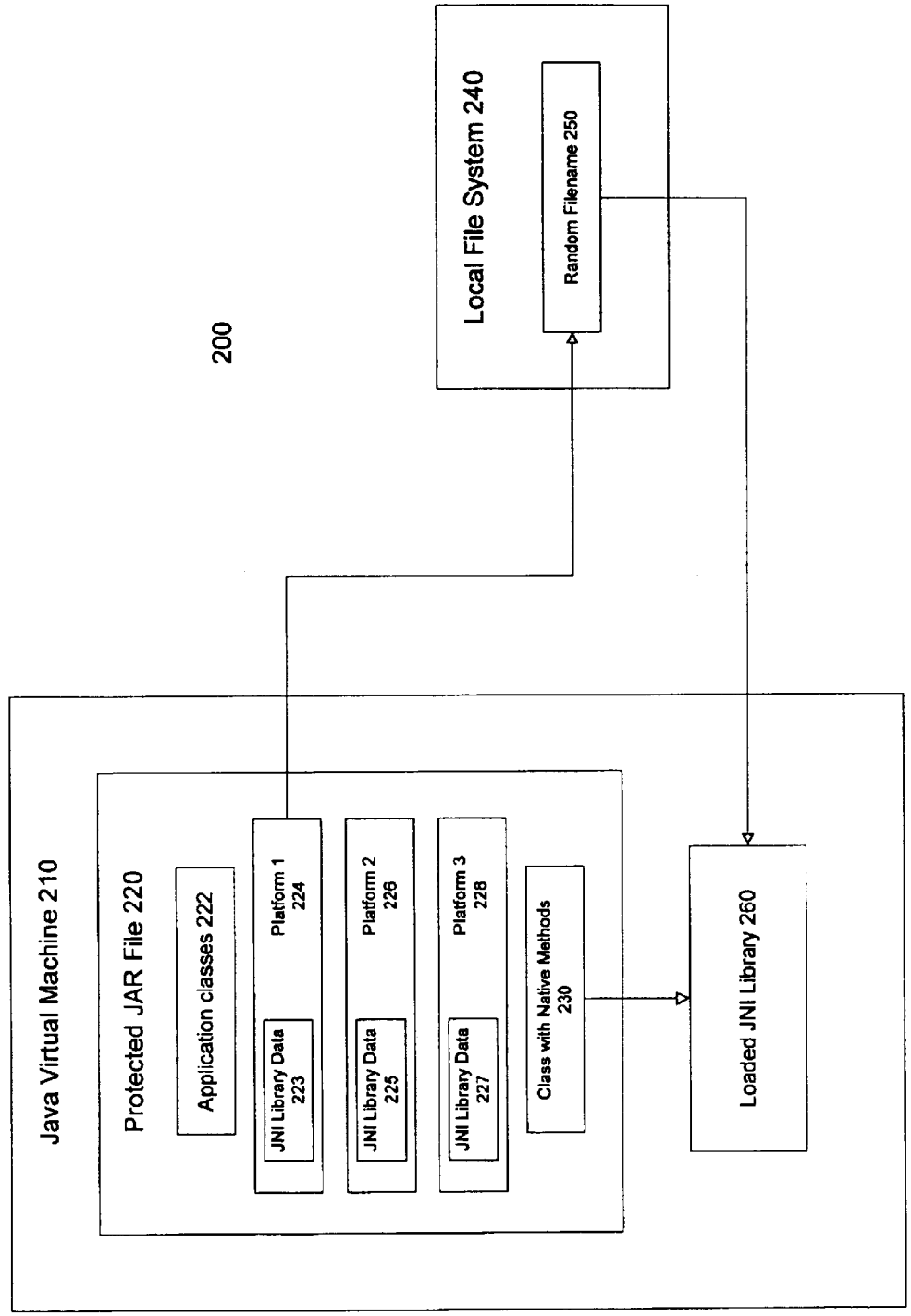
FIG. 2 is a block diagram of a system for protecting native libraries for Java applications according to an embodiment of the present invention.

FIG. 2 illustrates a block diagram of a system 200 for protecting native libraries for Java applications according to an embodiment of the present invention. System 200 includes a JVM 210, a JAR file 220, and a Local File System 240. Depending on the type of application, other components may also be included. JVM 210 may include a program that interprets Java bytecodes into machine code on a computer's operating system. JAR file 220 may contain application classes 222 which may implement one or more Java applications. The JAR file 220 may be protected through various methods. Protection may be provided through symbolic obfuscation, data obfuscation, signing, or any other method of protecting Java code. Protected JAR file 220 may contain one or more classes which contain native methods, as shown by 230. In addition, Protected JAR file 220 may contain one or more platform-specific classes, as shown by Platform 1, 224; Platform 2, 226; and Platform 3, 228. Each platform-specific classes may have embedded within it data that creates a JNI library for each platform, as shown respectively by JNI Library Data 223, JNI Library Data 225, and JNI Library Data 227.

Prior to native method invocation, the JVM 210 loads the JNI library, which implements the native methods, to create Loaded JNI Library 260. To do so, the class containing the JNI library data that corresponds to a platform is selected. In this example, JNI Library Data 223 is selected because the desired platform 1, as shown in 224, corresponds to JNI Library Data 223. The JNI library data 223 may then be extracted by decoding the string embedded in the class and writing to a randomly chosen filename 250, in Local File System 240. Writing to a randomly chosen filename provides further security and protection against hackers and attackers, and other modes of corruption. Because the library is written to a different randomly chosen file each time, an attacker will not know beforehand what library is to be used and therefore cannot easily replace it. The method for selecting the randomly chosen filename 250 is one important factor in providing protection to native libraries. For example, using the current time, or some derivation of the current time may not provide adequate security. The filename may be derived from various sources of randomness, which may include the current time, Java object references and the timing of various events, including context switches, file access, keyboard, mouse, and other sources of randomness. The JNI library may then be loaded into the JVM 210 via a System.loadO call. Other loading calls may also be utilized. After JVM 210 loads the JNI library 260, Java classes may call and invoke native methods, as shown via 230, for example. Thus, the data used to create the JNI library is stored in the application JAR file 220, where it may be protected by the same protection mechanism that protects the Java code.

According to another embodiment of the present invention, a mechanism for preventing pre-loading symbols containing the same or similar symbols from different native libraries may be implemented.

Figure 3:
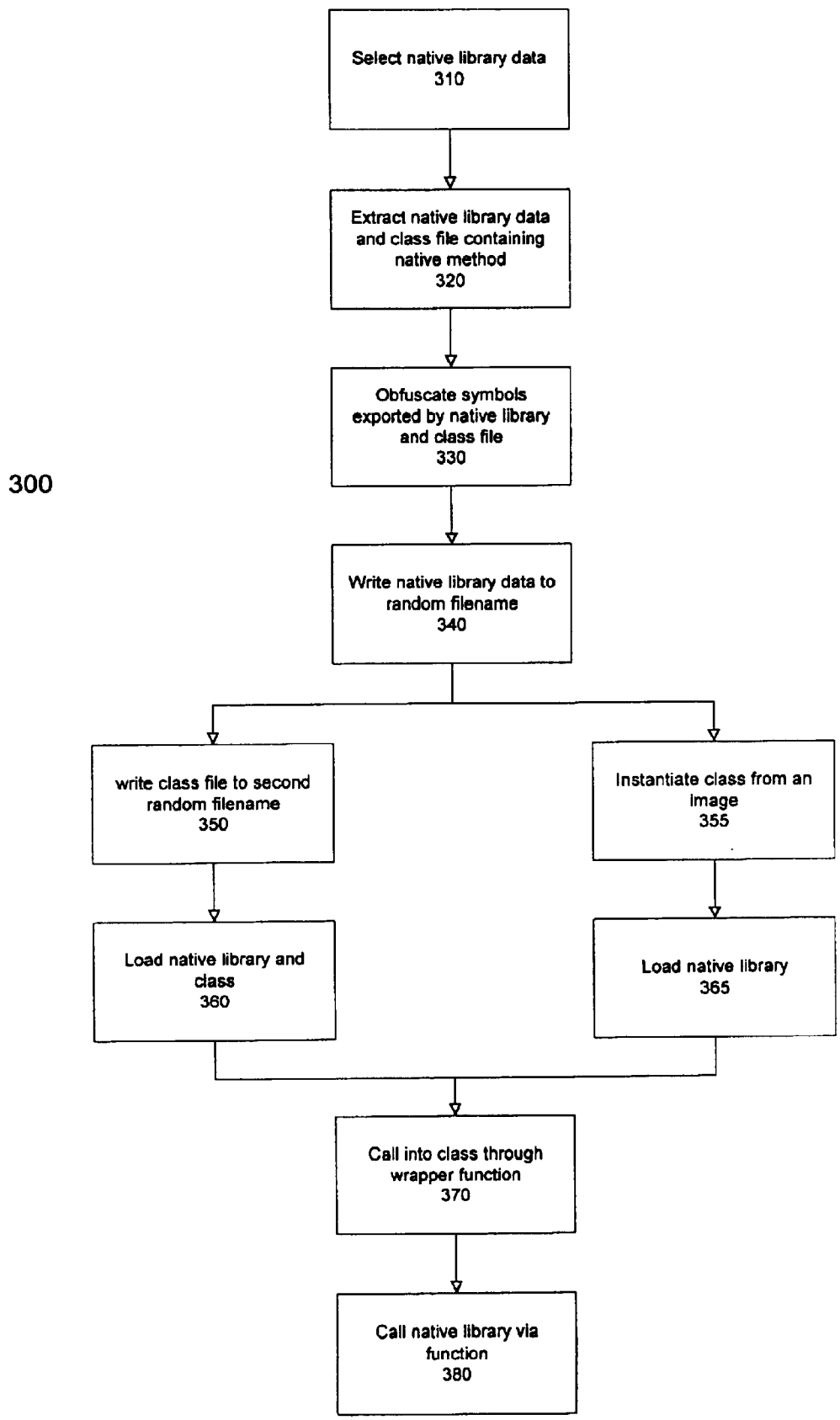
FIG. 3 is a flowchart of an extraction process for protecting native libraries from symbol pre-loading according to an embodiment of the present invention.

FIG. 3 illustrates a flowchart of an extraction process 300 of the present invention for protecting a native library from symbol pre-loading. The extraction process 300 may be used with the preceding steps of embedding a native library in a system of code and protecting the system of code, as discussed above. In step 310, the native library data associated with the native library may be selected. In step 320, the native library data and the class file containing the native methods may be extracted from a system of code where the system of code may be protected. In step 330, the symbols exported by the native library may be obfuscated or randomly renamed by other methods. The class file that contains the native method also undergoes a parallel obfuscation, or other method of randomly renaming symbols. The native library data is then written to a first randomly selected filename in a local file system, at step 340. In addition, the class file is written to a second randomly selected filename, at step 350. According to another embodiment of the present invention, the class file with obfuscated symbols is not written to the local file system. Rather, the class may be instantiated from an in-memory representation of the class by a specialized class loader, as shown by step 355. This may be accomplished by creating a specialized class loader where the class is instantiated from an image (e.g., bytes in memory) rather than writing the class file to a medium, such as a disk. According to another embodiment of the present invention, the native library may be modified in additional ways that would allow the system of code to identify the native library as being authentic.

In step 360, the native library may be loaded via System.load( ) command, for example, and the class file may be loaded via a class loader, for example. Other methods for loading may also be implemented. Alternatively, if the class was previously instantiated in step 355, the native library may be loaded in step 365, via System.load ( ) command, for example. Step 365 does not require loading the class when the class is instantiated from an image in memory. A code application may then call into the loaded class through a wrapper function, for example, at step 370, which then may call into the native library, at step 380.

Figure 4:
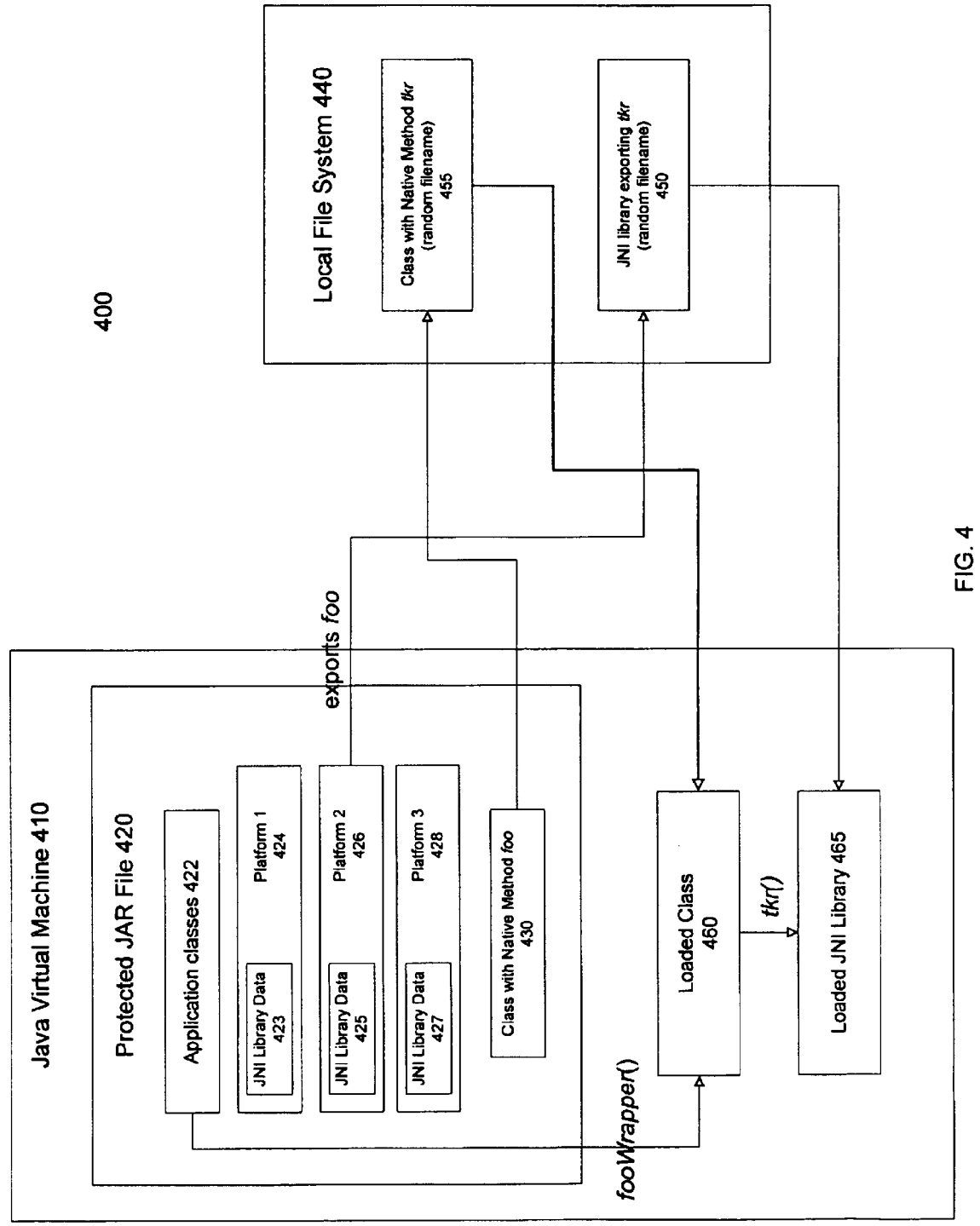
FIG. 4 is a block diagram of a system for protecting native libraries for Java applications from symbol pre-loading according to an embodiment of the present invention.

FIG. 4 illustrates a block diagram of a system 400 for protecting native libraries for Java applications from symbol pre-loading according to an embodiment of the present invention. System 400 includes a JVM 410, a JAR file 420, and a Local File System 440. Depending on the type of application, other components may also be included. In this example, a class file containing a native method "foo", as shown by 430 and a corresponding Platform 2, 426 and JNI library data 425 that exports "foo" is selected and extracted. The symbol "foo" is then obfuscated to a different symbol, for example, "tkr". The symbol may be randomly renamed by other methods. The class file and the JNI library then have all occurrences of the symbol "foo" replaced with the randomly renamed symbol "tkr", and are written to Local File System 440 under random filenames. For example, the class file has been written to random filename 455 while JNI library has been written to a different random filename 450. In another embodiment, the class may be instantiated from an image (e.g., bytes in memory) representation of the class, rather than writing the class file to the Local File System 440.

At this point, the class with native method "tkr" may be loaded into JVM 410, as shown by Loaded Class 460, via Java's class loader or a specialized class loader, or other mode of loading a class. The JNI library exporting "tkr" may be loaded via System.load( ) call, as shown by Loaded JNI Library 465. Other loading calls may also be utilized. The Java application, as shown by Application classes 422, may then call into the loaded class through a wrapper or other function, which then calls into the JNI library. For example, Java application 422 may call into Loaded Class tkr( ) 460 via foowrapper( ), for example, which may then call into the Loaded JNI library 465 via the tkr( ) function, for example. Other functions and methods for calling classes and native libraries may also be utilized.

The present invention is not limited to embedding a native library in Java code. Other scripting languages (or systems of code) that allow binding to native code may be utilized in accordance with the present invention.

Other variations exist. For example, the JNI library data for each platform may be encoded in different ways or may be compressed. In addition, the JNI library for each platform might not be stored in separate classes. Each JNI library may be included as a resource in the JAR file 220 or 420, or all of JNI libraries may be embedded in a single class, according to another embodiment of the present invention.

According to another embodiment of the present invention, the method and system for protecting native libraries may be used in zero-installation environments (i.e., environments where all components required for execution are downloaded on demand). Traditional JNI libraries require installation on the local file system before a class file which uses the native methods can be used. However, the present invention enables the native code to be downloaded with the Java code so that the JNI library need not be installed ahead of time.

Other embodiments and uses of the invention will be apparent to those skilled in the art from consideration of the specification and practice of the invention disclosed herein. The specification and examples should be considered exemplary only.

What is claimed is:

1. A method of protecting one or more native libraries to be used with code applications comprising steps of:

embedding the one or more native libraries in a system of code; and protecting the system of code using a protection mechanism.

2. The method of claim 1 wherein the protection mechanism comprises Java protection mechanism.

3. The method of claim 2 wherein the Java protection mechanism comprises one or more of symbolic obfuscation, cryptographic obfuscation, or signed code.

4. A method of protecting one or more native libraries to be used with code applications comprising steps of:

embedding the one or more native libraries in a system of code;

protecting the system of code using a protection mechanism; and extracting the native library during execution of an application, but prior to the invocation of a native method of the embedded one or more native libraries contained in the system of code.

5. The method of claim 4 wherein the extracting step comprises the steps of:

selecting data associated with a predetermined native library of the one or more native libraries embedded in the system of code;

extracting data associated with the predetermined native library from the system of code;

writing the data associated with the predetermined native library to a filename in a local file system; and loading the predetermined native library into an environment to enable implementation of one or more native methods associated with the predetermined native library from the local file system.

6. The method of claim 5 wherein the filename is a randomly selected filename.

7. The method of claim 4 wherein the extracting step comprises the steps of:

selecting data associated with a predetermined native library of the one or more native libraries embedded in the system of code;

extracting data associated with the predetermined native library from the system of code;

extracting a class file containing one or more native methods associated with the predetermined native library;

randomly renaming symbols exported by the predetermined native library;

randomly renaming symbols contained in the class file containing one or more native methods associated with the predetermined native library;

writing the data associated with the predetermined native library to a first filename in a local file system;

writing the class file containing one or more native methods associated with the predetermined native library to a second filename in the local file system; and loading the predetermined native library and class file into an environment to enable implementation of one or more native methods associated with the predetermined native library from the local file system.

8. The method of claim 7 where the step of randomly renaming comprises obfuscation.

9. The method of claim 7 further comprising the step of calling into the loaded class file through a wrapper function wherein the wrapper function calls into the loaded predetermined native library.

10. The method of claim 7 wherein the first filename is a randomly selected filename.

11. The method of claim 7 wherein the second filename is a randomly selected filename.

12. The method of claim 4 wherein the extracting step comprises the steps of:

selecting data associated with a predetermined native library of the one or more native libraries embedded in the system of code;

extracting data associated with the predetermined native library from the system of code;

extracting a class file containing one or more native methods associated with the predetermined native library;

randomly renaming symbols exported by the predetermined native library;

randomly renaming symbols contained in the class file containing one or more native methods associated with the predetermined native library;

writing the data associated with the predetermined native library to a first filename in a local file system;

instantiating a class containing one or more native methods associated with the predetermined native library from an image representation of the class; and loading the predetermined native library into an environment to enable implementation of one or more native methods associated with the predetermined native library.

13. The method of claim 12 where the step of randomly renaming comprises obfuscation.

14. The method of claim 12 further comprising the step of calling into the loaded class file through a wrapper function wherein the wrapper function calls into the loaded predetermined native library.

15. The method of claim 12 wherein the first filename is a randomly selected filename.

16. A system for protecting one or more native libraries to be used with code applications comprising:

an embedding means for embedding the one or more native libraries in a system of code; and a protection means for protecting the system of code using a protection mechanism.

17. The system of claim 16 wherein the protection mechanism comprises a Java protection mechanism.

18. The system of claim 17 wherein the Java protection mechanism comprises one or more of symbolic obfuscation, cryptographic obfuscation, or signed code.

19. A system for protecting one or more native libraries to be used with code applications comprising:

embedding means for embedding the one or more native libraries in a system of code;

protection means for protecting the system of code using a protection mechanism; and extracting means for extracting the native library during execution of an application, but prior to the invocation of a native method of the embedded one or more native libraries contained in the system of code.

20. The system of claim, 19 wherein the extracting means comprises:

a selecting means for selecting data associated with a predetermined native library of the one or more native libraries embedded in the system of code;

a data extracting means for extracting data associated with the predetermined native library from the system of code;

a writing means for writing the data associated with the predetermined native library to a filename in a local file system; and a loading means for loading the predetermined native library into an environment to enable implementation of one or more native methods associated with the predetermined native library from the local file system.

21. The system of claim 20 wherein the filename is a randomly selected filename.

22. The system of claim 19 wherein the extracting means comprises the steps of:

a selecting means for selecting data associated with a predetermined native library of the one or more native libraries embedded in the system of code;

a data extracting means for extracting data associated with the predetermined native library from the system of code;

a class extracting means for extracting a class file containing one or more native methods associated with the predetermined native library;

a first renaming means for randomly renaming symbols exported by the predetermined native library;

a second renaming means for randomly renaming symbols contained in the class file containing one or more native methods associated with the predetermined native library;

a data writing means for writing the data associated with the predetermined native library to a first filename in a local file system;

a class writing means for writing the class file containing one or more native methods associated with the predetermined native library to a second filename in the local file system; and a loading means for loading the predetermined native library and class file into an environment to enable implementation of one or more native methods associated with the predetermined native library from the local file system.

23. The system of claim 22 where the step of randomly renaming comprises obfuscation.

24. The system of claim 22 further comprising the step of calling into the loaded class file through a wrapper function wherein the wrapper function calls into the loaded predetermined native library.

25. The system of claim 22 wherein the first filename is a randomly selected filename.

26. The system of claim 22 wherein the second filename is a randomly selected filename.

27. The system of claim wherein the extracting means comprises the steps of:

a selecting means for selecting data associated with a predetermined native library of the one or more native libraries embedded in the system of code;

a data extracting means for extracting data associated with the predetermined native library from the system of code;

a class extracting means for extracting a class file containing one or more native methods associated with the predetermined native library;

a first renaming means for randomly renaming symbols exported by the predetermined native library;

a second renaming means for randomly renaming symbols contained in the class file containing one or more native methods associated with the predetermined native library;

a data writing means for writing the data associated with the predetermined native library to a first filename in a local file system;

a class instantiating means for instantiating a class containing one or more native methods associated with the predetermined native library from an image representation of the class; and a loading means for loading the predetermined native library into an environment to enable implementation of one or more native methods associated with the predetermined native library.

28. The system of claim 27 where the step of randomly renaming comprises obfuscation.

29. The system of claim 27 further comprising the step of calling into the loaded class file through a wrapper function wherein the wrapper function calls into the loaded predetermined native library.

30. The system of claim 27 wherein the first filename is a randomly selected filename.

31. A processor readable medium having processor readable code embodied therein for accessing data on a computer-based data accessing system, the processor readable medium comprising:

processor readable code for embedding the one or more native libraries in a system of code; and processor readable code for protecting the archive file using a protection mechanism.

32. The processor of claim 31 wherein the protection mechanism comprises a Java protection mechanism.

33. A processor readable medium having processor readable code embodied therein for accessing data on a computer-based data accessing system, the processor readable medium comprising:

processor readable code for embedding the one or more native libraries in a system of code;

processor readable code for protecting the archive file using a protection mechanism; and processor readable code for extracting the native library during execution of an application, but prior to the invocation of native methods of the embedded native libraries contained in the system of code.

34. The processor of claim 33 further comprising:

processor readable code for causing a processor to select a class containing data associated with a predetermined native library of the one or more native libraries embedded in the system of code;

processor readable code for causing a processor to extract data associated with the predetermined native library from the system of code;

processor readable code for causing a processor to write the data associated with the predetermined native library to a filename in a local file system;

processor readable code for causing a processor to load the predetermined native library into an environment to enable implementation of one or more native methods associated with the predetermined native library.

35. The processor of claim 34 wherein the filename is a randomly selected filename.

36. The processor of claim 33 further comprising:

processor readable code for selecting data associated with a predetermined native library of the one or more native libraries embedded in the system of code;

processor readable code for extracting data associated with the predetermined native library from the system of code;

processor readable code for extracting a class file containing one or more native methods associated with the predetermined native library;

processor readable code for randomly renaming symbols exported by the predetermined native library;

processor readable code for randomly renaming symbols contained in the class file containing one or more native methods associated with the predetermined native library;

processor readable code for writing the data associated with the predetermined native library to a first filename in a local file system;

processor readable code for writing the class file containing one or more native methods associated with the predetermined native library to a second filename in the local file system; and processor readable code for loading the predetermined native library and class file into an environment to enable implementation of one or more native methods associated with the predetermined native library from the local file system.

37. The processor of claim 33 further comprising:

processor readable code for selecting data associated with a predetermined native library of the one or more native libraries embedded in the system of code;

processor readable code for extracting data associated with the predetermined native library from the system of code;

processor readable code for extracting a class file containing one or more native methods associated with the predetermined native library;

processor readable code for randomly renaming symbols exported by the predetermined native library;

processor readable code for randomly renaming symbols contained in the class file containing one or more native methods associated with the predetermined native library;

processor readable code for writing the data associated with the predetermined native library to a filename in a local file system;

processor readable code for instantiating a class containing one or more native methods associated with the predetermined native library from an image representation of the class; and processor readable code for loading the predetermined native library into an environment to enable implementation of one or more native methods associated with the predetermined native library.

* * * * *